United States Patent
Yun et al.

(10) Patent No.: US 9,940,265 B2
(45) Date of Patent: Apr. 10, 2018

(54) COMPUTING SYSTEM AND METHOD OF OPERATING COMPUTING SYSTEM

(75) Inventors: Suk-Jin Yun, Seoul (KR); Jun-bum Shin, Suwon-si (KR); Moon-gyu Jung, Suwon-si (KR); Byung-ho Cha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 352 days.

(21) Appl. No.: 13/599,617

(22) Filed: Aug. 30, 2012

(65) Prior Publication Data
US 2013/0054978 A1    Feb. 28, 2013

(30) Foreign Application Priority Data
Aug. 30, 2011    (KR) .................. 10-2011-0087196

(51) Int. Cl.
| | | |
|---|---|---|
| G06F 12/14 | (2006.01) | |
| G06F 21/82 | (2013.01) | |
| G06F 21/84 | (2013.01) | |

(52) U.S. Cl.
CPC .............. G06F 12/14 (2013.01); G06F 21/82 (2013.01); G06F 21/84 (2013.01); *G06F 2221/2107* (2013.01)

(58) Field of Classification Search
CPC ........................ G06F 12/14; G06F 15/17331
USPC .................... 713/160, 189; 726/26
See application file for complete search history.

(56) References Cited

U.S. PATENT DOCUMENTS

| | | | |
|---|---|---|---|
| 7,434,052 B1* | 10/2008 | Rump | H04N 7/1675 348/E7.056 |
| 7,792,296 B2 | 9/2010 | Bennett | |
| 7,810,163 B2 | 10/2010 | Evans et al. | |
| 8,646,052 B2 | 2/2014 | Vembu et al. | |
| 2003/0046590 A1* | 3/2003 | Bender | H04L 63/0853 726/21 |
| 2005/0086321 A1* | 4/2005 | Folk, II | H04L 63/0464 709/213 |
| 2005/0265547 A1 | 12/2005 | Strasser et al. | |
| 2006/0218647 A1* | 9/2006 | Hars et al. | 726/27 |
| 2007/0097130 A1* | 5/2007 | Margulis | G06F 3/1431 345/501 |
| 2007/0106906 A1 | 5/2007 | Koike et al. | |
| 2008/0120676 A1* | 5/2008 | Morad et al. | 725/127 |

(Continued)

FOREIGN PATENT DOCUMENTS

| | | |
|---|---|---|
| CN | 1471021 A | 1/2004 |
| CN | 1774755 A | 5/2006 |

(Continued)

OTHER PUBLICATIONS

Foukarakis et al, Deep Packet Anonymization, ACM, 2009, pp. 16-21.*

(Continued)

*Primary Examiner* — Luu Pham
*Assistant Examiner* — Jenise Jackson
(74) *Attorney, Agent, or Firm* — Sughrue Mion, PLLC (57) ABSTRACT

A computing system including a memory that is shared by a plurality of components of the computing system in order to exchange data between the plurality of components; and a controller configured to control the plurality of components to encrypt the data and to record the encrypted data in the memory.

18 Claims, 8 Drawing Sheets

(56) References Cited

U.S. PATENT DOCUMENTS

| | | | | |
|---|---|---|---|---|
| 2008/0189213 | A1* | 8/2008 | Blake | G06F 21/10 705/59 |
| 2008/0267411 | A1* | 10/2008 | Peterka | H04L 9/0841 380/279 |
| 2009/0172401 | A1* | 7/2009 | Cizas et al. | 713/169 |
| 2009/0172758 | A1* | 7/2009 | Vantalon | H04N 7/17318 725/110 |
| 2009/0265022 | A1* | 10/2009 | Kirovski et al. | 700/94 |
| 2009/0296929 | A1* | 12/2009 | Wachtfogel et al. | 380/213 |
| 2010/0185800 | A1* | 7/2010 | Pourbigharaz et al. | 710/107 |
| 2010/0313010 | A1* | 12/2010 | Tagawa | G11B 20/00086 713/150 |
| 2011/0022853 | A1 | 1/2011 | Donie et al. | |
| 2011/0047255 | A1* | 2/2011 | Yoshikawa | 709/223 |
| 2011/0064217 | A1 | 3/2011 | Fry et al. | |
| 2011/0078760 | A1 | 3/2011 | De Perthuis | |
| 2011/0247079 | A1* | 10/2011 | Candelore | G06F 21/10 726/27 |
| 2012/0050259 | A1* | 3/2012 | Solomonov et al. | 345/419 |
| 2012/0137139 | A1* | 5/2012 | Kudoh | H04L 9/10 713/189 |
| 2013/0006866 | A1* | 1/2013 | Pendakur | G06Q 30/0241 705/50 |
| 2014/0047490 | A1* | 2/2014 | Vantalon | H04N 7/17318 725/110 |
| 2014/0075502 | A1* | 3/2014 | Aissi | G06F 21/60 726/1 |
| 2014/0112471 | A1* | 4/2014 | Pendakur | G06F 21/123 380/229 |
| 2014/0222168 | A1* | 8/2014 | Ahn et al. | 700/17 |

FOREIGN PATENT DOCUMENTS

| | | |
|---|---|---|
| CN | 1808972 A | 7/2006 |
| CN | 101661544 A | 3/2010 |
| CN | 102063598 A | 5/2011 |

OTHER PUBLICATIONS

Kayem et al, A Framework for Self-Protecting Cryptographic Key Management, IEEE, 2008, pp. 191-200.* http://www.arm/com/products/processors/technologies/trustzone.php, 5 pages total, 2012, retrieved from the Internet on Aug. 30, 2012.

http://www.digital-cp.com, 2 pages total, 2012, retrieved from the internet on Aug. 30, 2012.

http://www.dtcp.com, 2 pages total, 2010, retrieved from the Internet on Aug. 30, 2012.

Communication from the State Intellectual Property Office of P.R. China dated Apr. 18, 2016 in a counterpart Chinese application No. 201210316363.7.

Communication dated Dec. 29, 2016, issued by the State Intellectual Property Office of P.R. China in counterpart Chinese Application No. 201210316363.7.

Communication from the State Intellectual Property Office of P.R. China dated Sep. 20, 2016, in counterpart Chinese Application No. 201210316363.7.

* cited by examiner

COMPUTING SYSTEM AND METHOD OF OPERATING COMPUTING SYSTEM

CROSS-REFERENCE TO RELATED PATENT APPLICATION

This application claims priority from Korean Patent Application No. 10-2011-0087196, filed on Aug. 30, 2011 in the Korean Intellectual Property Office, the disclosure of which is incorporated herein in its entirety by reference.

BACKGROUND

1. Field

Systems and methods consistent with exemplary embodiments relate to a computing system and a method of operating the computing system, and more particularly, to a computing system for protecting data in a shared memory and a method of operating the computing system.

2. Description of the Related Art

In an open platform environment where independent inventors can develop and register applications other than operating systems, there is an increasing need to ensure secure platforms for safely protecting content.

In order to safely provide content from a source device to a target device, conventional content protecting technologies such as digital rights management (DRM) or link protection has been used.

However, end-to-end protection has not been considered for these conventional content protecting technologies. For example, when DRM is released before audio/video (AV) content to which the DRM is applied is used in a target device, the AV content is temporally decrypted in the target device. In this case, external attackers may illegally copy the AV content.

SUMMARY

One or more exemplary embodiments provide a computing system for protecting data in a shared memory and a method of operating the computing system.

According to an aspect of an exemplary embodiment, there is provided a computing system including a memory that is shared by a plurality of components of the computing system in order to exchange data between the plurality of components; and a controller configured to control the plurality of components to encrypt the data and to record the encrypted data in the memory.

According to an aspect of another exemplary embodiment, there is provided a method of operating a computing system, the method including encrypting data when a memory is shared by a plurality of components of the computing system in order to exchange data between the plurality of components; and recording the encrypted data in the memory.

BRIEF DESCRIPTION OF THE DRAWINGS

The above and other aspects will become more apparent by describing in detail exemplary embodiments with reference to the attached drawings in which.

DETAILED DESCRIPTION OF EXEMPLARY EMBODIMENTS

While describing the exemplary embodiments, detailed descriptions about related well-known functions or configurations that may diminish the clarity of certain aspects of the exemplary embodiments are omitted.

Terms or words used herein shall not be limited to having common or dictionary meanings, and may have meanings corresponding to technical aspects of the exemplary embodiments so as to most suitably describe the exemplary embodiments.

Reference will now be made in detail to various embodiments, examples of which are illustrated in the accompanying drawings.

Figure 1:
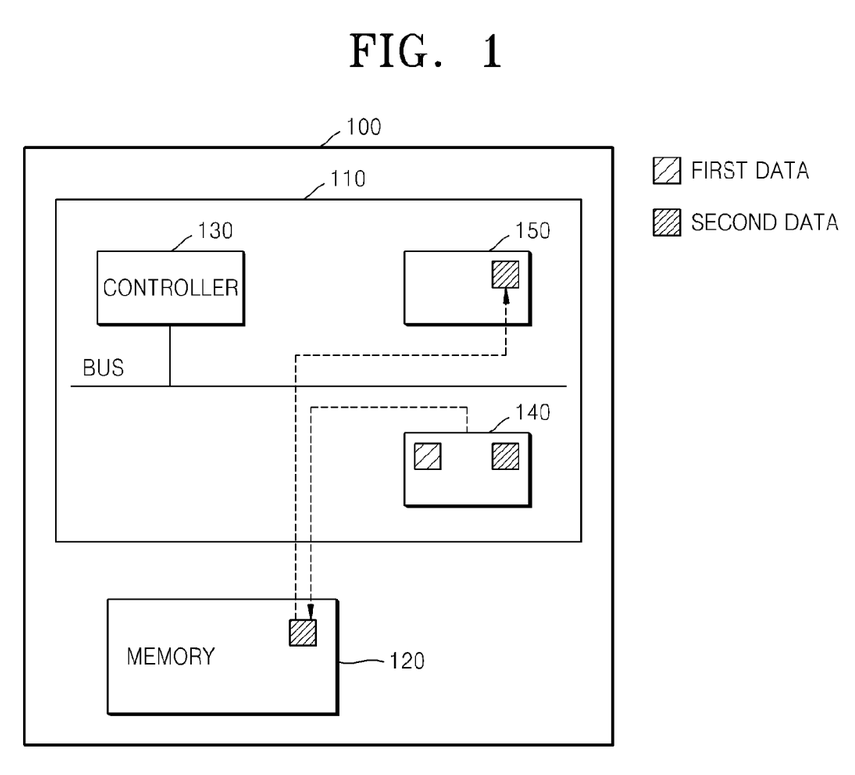
FIG. 1 is a block diagram of a computing system according to an exemplary embodiments.

FIG. 1 is a block diagram of a computing system 100 according to an exemplary embodiments Referring to FIG. 1, the computing system 100 includes a processor 110 and a memory 120.

The processor 110 that is also referred to as an application processor 110 includes a controller 130 and first and second components 140 and 150 of the computing system 100.

The first and second components 140 and 150 of the computing system 100 perform a function of a graphic processing unit (GPU). For convenience of illustration, only the first component 140 and the second component 150 are shown in FIG. 1. However, it will be understood that at least two components that are separated in units of function blocks may be used or alternatively, a single combined component performing various functions may be used.

The memory 120 is a shared local memory that is shared by the first and second components 140 and 150 of the computing system 100 in order to exchange data therebetween. An example of the memory 120 includes a double data rate (DDR) memory, but is not limited thereto.

The controller 130 is a device for controlling the computing system 100. The controller 130 controls a series of operations of receiving data from various input devices, processing the data, and then transmitting a result to an output device. That is, the controller 130 serves as a host central processing unit (CPU). Operation of the controller 130 will now be described.

First data of the first component 140 is decryption state data.

It is assumed that the first data of the first component 140 is transmitted to the second component 150 through the memory 120 rather than being used in the first component 140 or being transmitted to an external device.

In this case, the controller 130 controls the first component 140 to apply a protection technology according to the exemplary embodiment to the first data so as to generate second data that is encryption state data. The protection technology according to the present exemplary embodiment is a predetermined encryption/decryption technology that is determined between the first and second components 140 and 150 in order to protect data and will be referred to as a 'first protection technology'. In this case, according to the present exemplary embodiment, the first component 140 and the second component 150 may share a shared key for applying or releasing the first protection technology.

In the first protection technology, encryption is not performed on all data, but instead, encryption/decryption is performed on a predetermined region of a payload of data. A data structure for applying the first protection technology will be described later below with reference to FIGS. 4A and 4B.

Then, the controller 130 transmits the second data from the first component 140 to the memory 120.

Then, the controller 130 transmits the second data from the memory 120 to the second component 150.

The second component 150 generates the first data that is decryption state data in which the first protection technology is released. The second component 150 performs a unique data processing function on the first data. For example, when the second component 150 is a renderer, the second component 150 may perform rendering so as to display the first data on a display unit (not shown).

Figure 2:
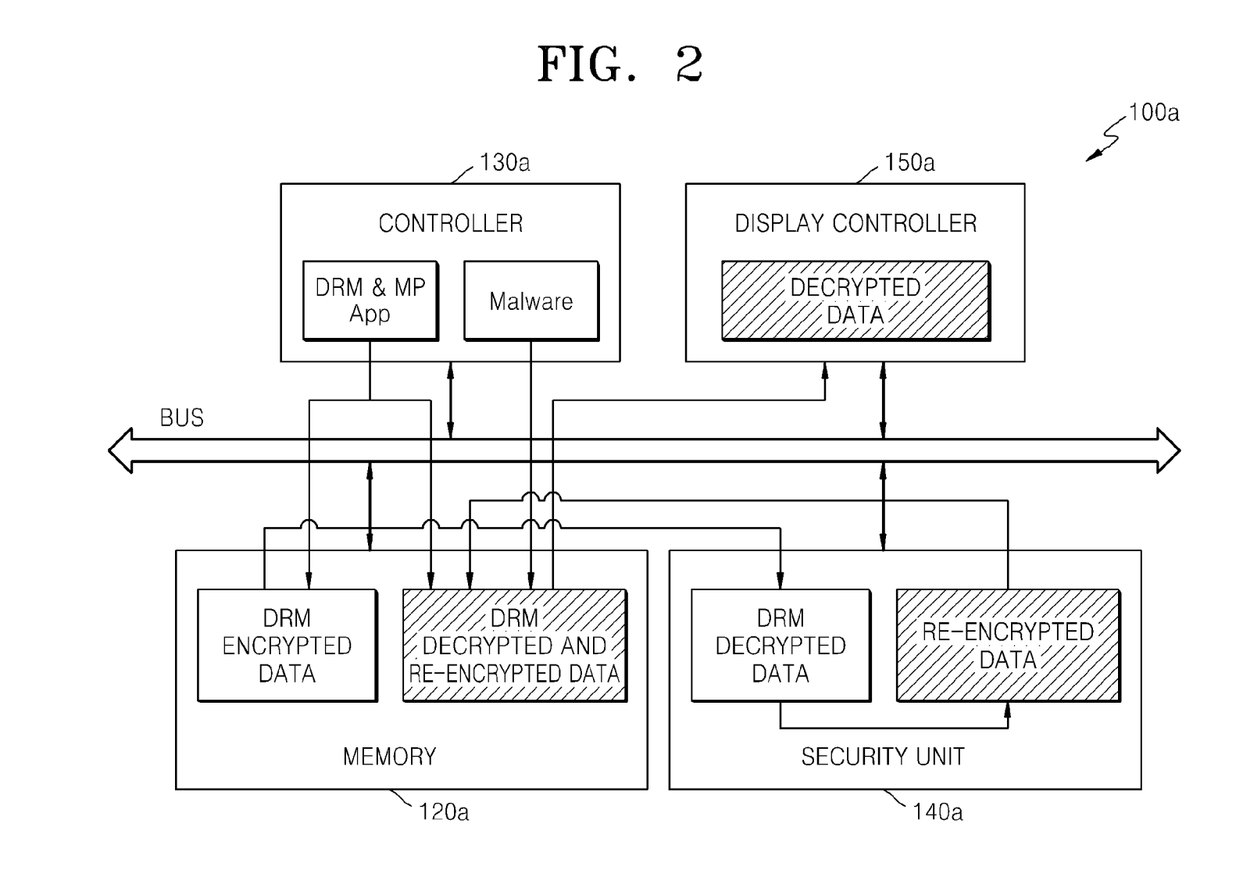
FIG. 2 is a schematic diagram for explaining an operation of a computing system, according to an exemplary embodiments.

FIG. 2 is a schematic diagram for explaining an operation of a computing system 100a, according to an exemplary embodiment.

The computing system 100a includes a memory 120a, a controller 130a, a security unit 140a, and a display controller 150a. For convenience of description, only the security unit 140a and the display controller 150a are exemplified as components of the computing system 100a. However, the computing system 100a may include various other components that perform a function of a GPU.

The controller 130a receives data that is encrypted by using digital rights management (DRM) from a source device (not shown) and stores the data in the memory 120a. According to the present exemplary embodiment, the DRM is exemplified as an external protection technology. However, the external protection technology may include various link protection technologies such as digital transmission content protection (DTCP) and high bandwidth digital content protection (HDCP), which allow digital content to be transmitted to reliable devices only.

Then, the controller 130a transmits the DRM encrypted data from the memory 120a to the security unit 140a (which is also referred to as a security subsystem). The security unit 140a decrypts the DRM encrypted data. Then, the security unit 140a generates re-encrypted data by encrypting the DRM decrypted data again by using the first protection technology. In this case, the data may be audio/video (AV) data, but is not limited thereto.

Then, the controller 130a transmits the re-encrypted data from the security unit 140a to the memory 120.

Accordingly, in the memory 120a, although the DRM encrypted data is decrypted, the data that is re-encrypted by using the first protection technology is present. Thus, even if malware accesses the memory 120a so as to capture data, it is impossible to illegally use the data.

Conventionally, during an AV processing process, since DRM encrypted data is temporally decrypted and exposed to outside a computing system, malware may access the data. However, according to the present exemplary embodiment, this problem may be overcome.

Then, the controller 130a transmits the re-encrypted data from the memory 120a to the display controller 150a.

The display controller 150a decrypts the re-encrypted data, decodes the decrypted data, renders the decoded data, and outputs the rendered data on a display unit (not shown).

As a result, the computing system 100 has the following advantages.

First, data may be protected by using a simple method in order to ensure a secure environment without complicated virtualization technology or heavy hardware.

Second, content may be protected by using hardware-based end-to-end protection technology rather than being dependent upon content protection technology based on a software (S/W) solution. In addition, the first protection technology is applied from a point of time when commercial DRM is released just before the rendering is performed.

Third, data that needs to be protected when being stored in the memory 120 is encrypted by using the first protection technology. Thus, even if malware present in the controller 130 accesses the memory 120 and illegally copies data, the data cannot be reproduced.

Fourth, a security level may be increased by using conventional content protection technologies with the first protection technology. For example, the first protection technology may be easily combined with a commercial DRM solution. That is, since the first protection technology may be applied to the memory 120 without being dependent upon the commercial DRM solution, the first protection technology may be easily combined with the commercial DRM solution.

Fifth, in an environment in which circulation markets of premium content are spread out, AV content having high image quality, such as 1080P, may be more easily ensured.

In addition, the computing system 100 may be used in a premium content streaming service of a mobile device, a premium content streaming service of internet protocol television (IPTV) and smart TV, and a premium content streaming service of a set-top box (STB).

Figure 3:
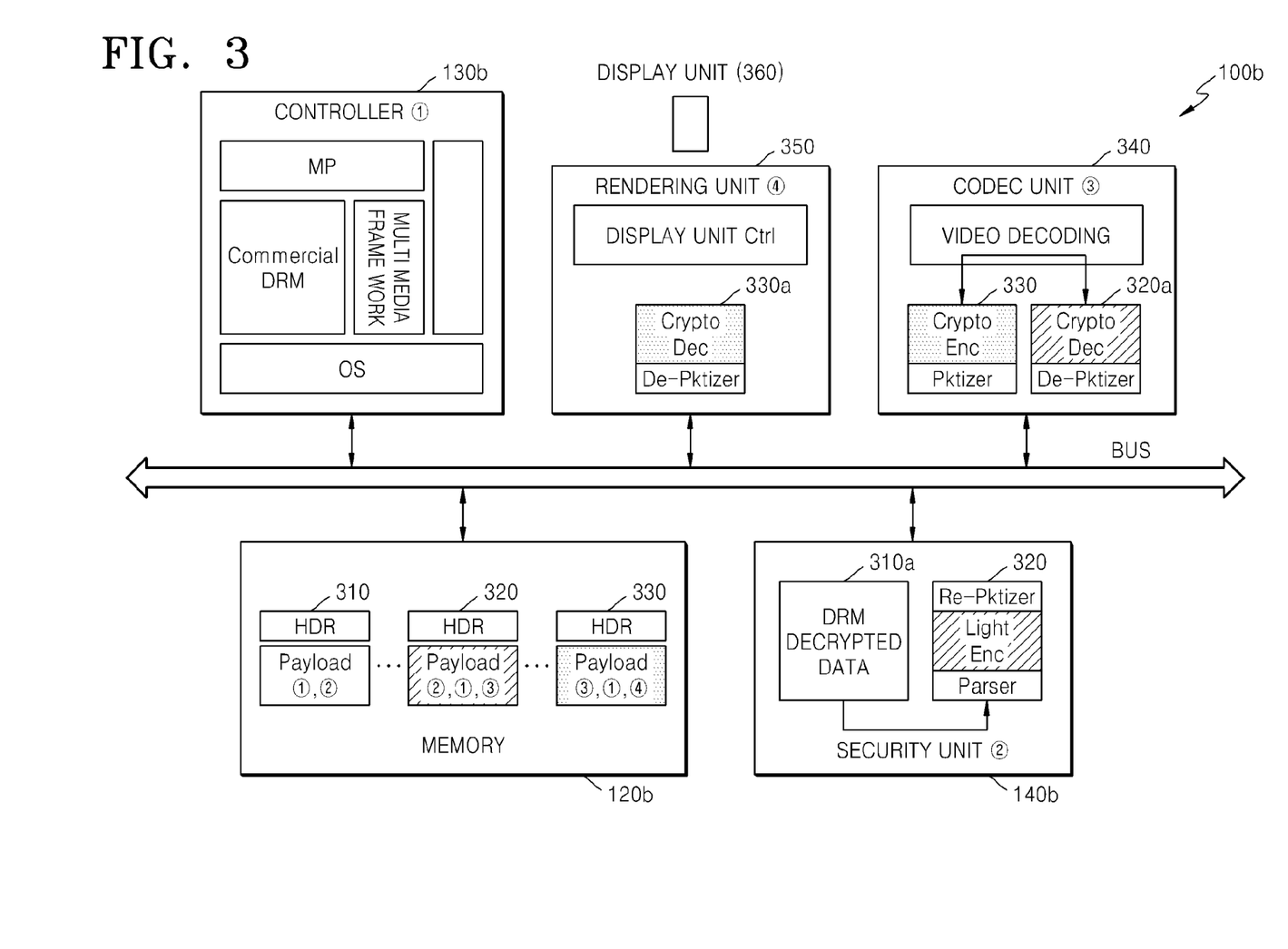
FIG. 3 is a detailed diagram for explaining an operation of a computing system, according to another exemplary embodiments.

FIG. 3 is a detailed diagram for explaining an operation of a computing system 100b, according to another exemplary embodiment.

Referring to FIG. 3, a controller 130b, a security unit 140b, a rendering unit 350, and a codec unit 340 share data with each other through a memory 120b and perform respective functions to perform a data processing process.

For convenience of description, the security unit 140b, the rendering unit 350, and the codec unit 340 are exemplified as components of the computing system 100b. However, the computing system 100b may include various components for performing a function of a GPU.

The first protection technology may be embodied in the components of the computing system 100b, except for the controller 130b, that is, in the memory 120b, the security unit 140b, the rendering unit 350, and the codec unit 340.

Data structures 320, 320a, 330, and 330a to which the first protection technology is applied are illustrated to have a slash pattern and a dot pattern. In this case, the same patterns have the same protection parameters and different patterns have different protection parameters. Throughout this specification, protection, crypto, and encryption/decryption have the same meaning.

In FIG. 3, 'Crypto' refers to a crypto engine for performing encryption/decryption. 'Enc' and the 'Dec' that are indicated below 'Crypto' refer to encryption and decryption functions performed by the crypto engine. According to the present exemplary embodiment, the crypto engine may have a relatively small size and a high speed.

The controller 130b generates a data structure including a header and a payload in order to apply the first protection technology to data and packetizes the data structure.

Numbers ①, ②, ③, and ④ in the data structures in the memory 120b refer to numbers of components of the computing system 100b, which are 130b, 140b, 340, 350 that access the data structures in the memory 120b, in FIG. 3.

That is, the controller 130b and the security unit 140b access the data structure 310. The controller 130b, the security unit 140b, and the codec unit 340 access the data structure 320. The controller 130b, the codec unit 340, and the rendering unit 350 access the data structure 330.

First, the controller 130b stores the data structure 310 that is encrypted by using DRM in the memory 120b.

Then, the controller 130b transmits the data structure 310 from the memory 120b to the security unit 140b.

Then, the security unit 140b decrypts the data structure 310 and generates the data structure 320 by re-encrypting the data structure 310a as a first protection parameter.

Then, the controller 130 transmits the data structure 320 that is re-encrypted as the first protection parameter from the security unit 140b to the memory 120b.

Then, the controller 130 transmits the data structure 320 from the memory 120b to the codec unit 340.

Then, the codec unit 340 decrypts the data structure 320. The codec unit 340 decodes the data structure 320a and generates the data structure 330 by re-encrypting the data structure 320a as a second protection parameter.

Then, the controller 130b transmits the data structure 330 that is re-encrypted as the second parameter from the codec unit 340 to the memory 120b.

Then, the controller 130b transmits the data structure 330 to the rendering unit 350. The rendering unit 350 decrypts the data structure 330. The rendering unit 350 renders the data structure 330a and displays the data structured 330a on a display unit 360.

Figure 4A:
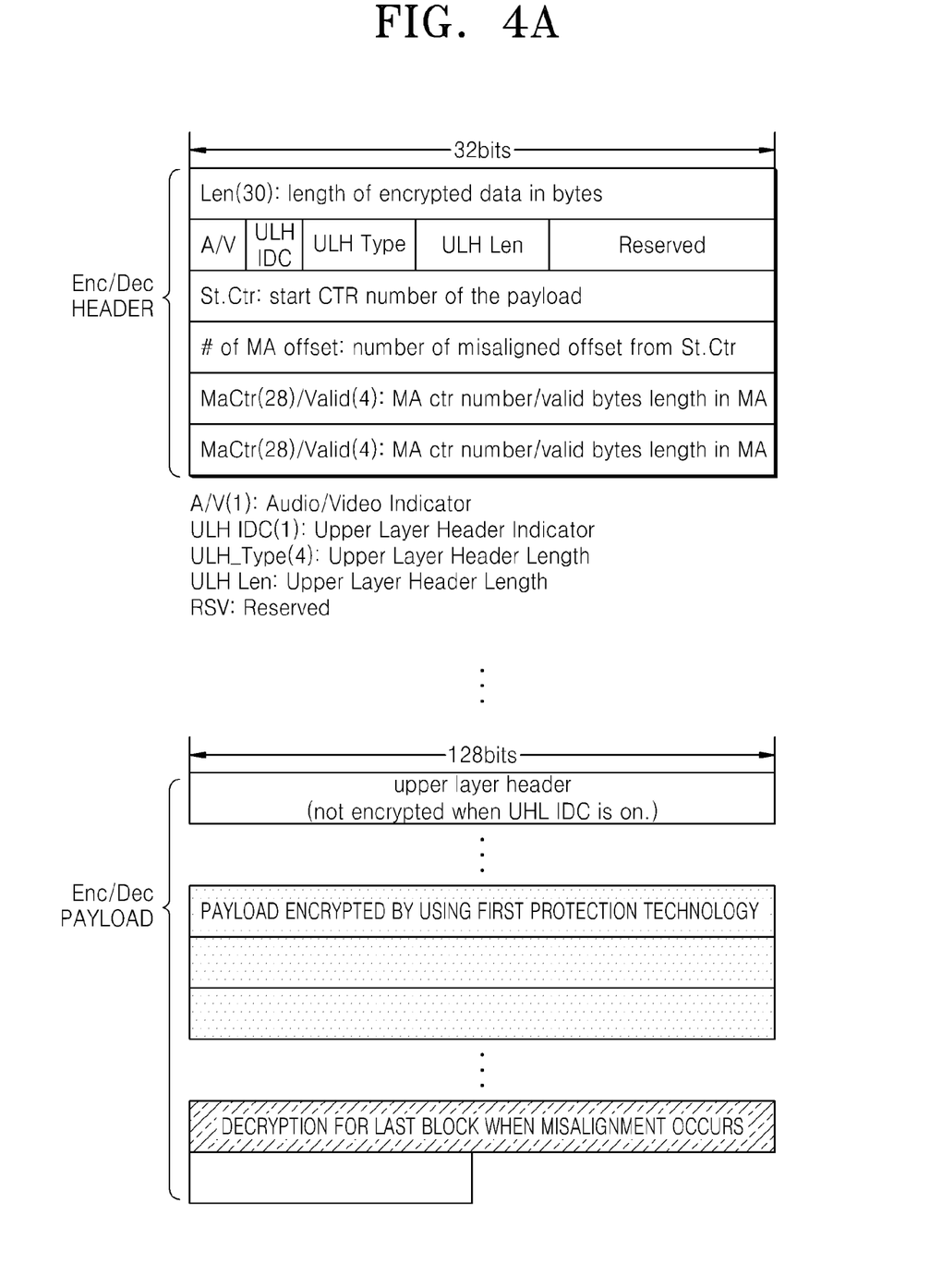
FIGS. 4A and 4B show data structures, according to an exemplary embodiments.
Figure 4B:
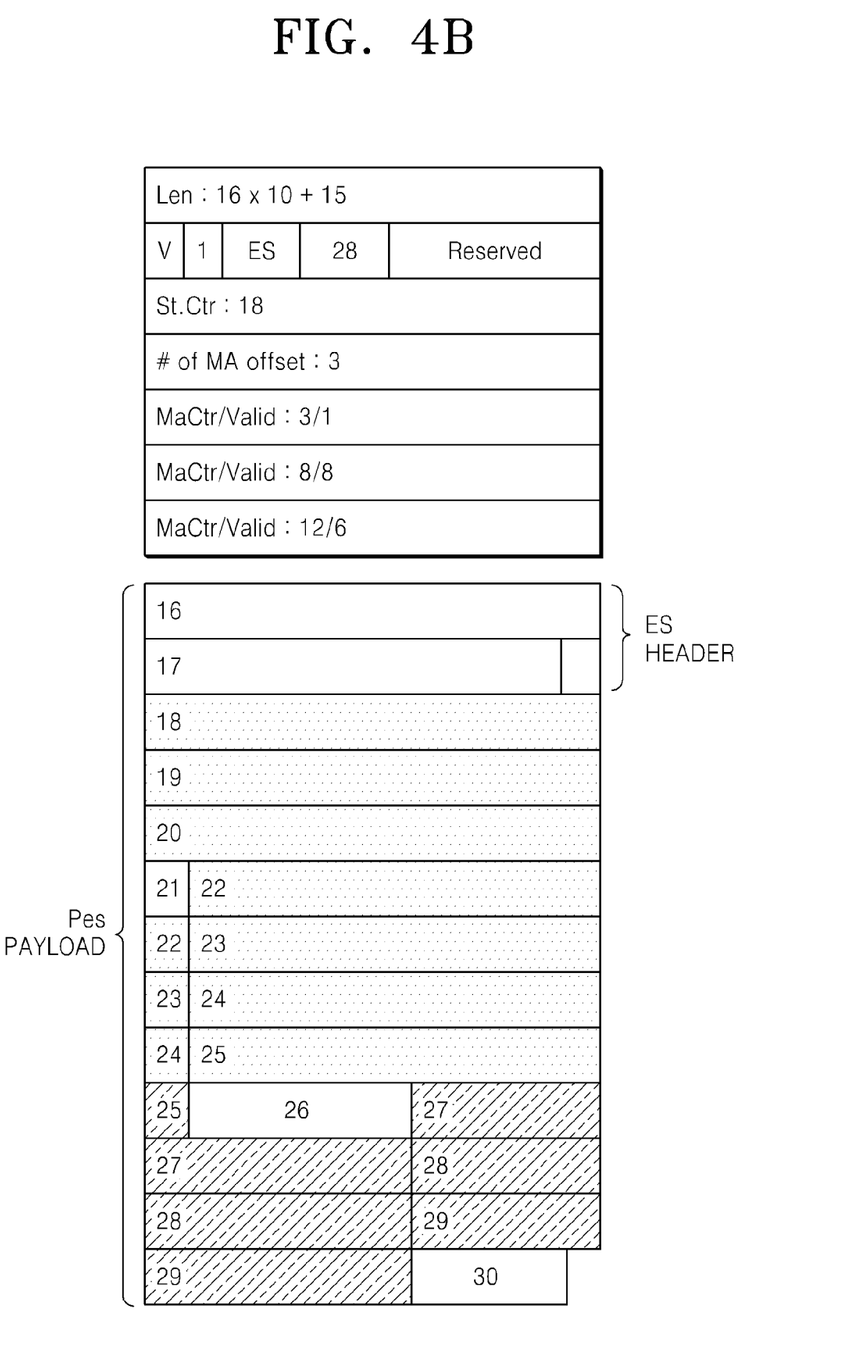

With reference to FIGS. 4A and 4B, a data structure that is illustrated in order to apply the first protection technology will now be described.

According to the present exemplary embodiment, the data structure that is adapted in order to apply the first protection technology includes an encryption/decryption (Enc/Dec) header, and an encryption/decryption (Enc/Dec) payload.

The Enc/Dec payload includes an elementary stream (ES) header and a packetized elementary stream (PES) payload. Throughout this specification, the 'header' and the 'payload' refer to an Enc/Dec Header and an Enc/Dec payload, which are formed by using the first protection technology. The PES payload is just an example, and thus the exemplary embodiments are not limited thereto. The PES may be of another transport protocol packet type.

The ES header is a header that is formed when original AV data is compressed by a codec and is generated from an upper AV protocol. In order to transmit an ES packet, an AV container such as AV1, MP2, WMA, or the like may be used.

For example, since the ES header includes information that is required to perform rending, the ES header is not encrypted and remains as plain text.

The ES header is formed by an upper layer and is a portion that cannot be controlled by using the first protection technology. On the other hand, the Enc/Dec header is formed by using the first protection technology.

Referring to FIG. 4A, a dot pattern of a payload indicates an encrypted data segment. A slash pattern indicates a segment that is not encrypted for a final block if misalignment occurs.

Two functions of data structures according to the exemplary embodiments will now be described.

With regard to a first function, a header of the data structure includes relevant information indicating a range of encryption/decryption in order to perform encryption/decryption by using the first protection technology.

With regard to a second function, according to the exemplary embodiments, when encryption/decryption is performed in units of blocks, misalignment is liked to occur by 128 bits. For reference, when encryption is performed in units of blocks, only data with a predetermined length may be input. Encryption is not performed on a last data portion where the misalignment occurs. In this case, the header of the data structure includes position information indicating a position from where encryption/decryption is not performed.

With reference to FIGS. 4A and 4B, an example of a data structure for performing the above-described two functions will now be described.

First, with reference to FIG. 4A, the first function of the data structure will be described.

'Len' indicates a payload length of the data structure that is defined according to the exemplary embodiments.

'A/V' indicates an identifier indicating whether a payload indicates audio data or video data.

'ULH IDC' indicates an identifier indicating whether upper layer headers to which encryption/decryption should not be applied are present in the payload.

'ULH Len' indicates a range (length) of a region to which encryption/decryption should not be applied when the upper layer headers to which encryption/decryption should not be applied are present in the payload.

With reference to FIGS. 4A and 4B, the second function of the data structure will be described.

'St.Ctr' is a first counter (CTR) number of the payload and is used as an input during encryption/decryption.

A data protection function may be further strengthened by adding a counter value in addition to a key value, as an input of the crypto engine (refer to FIG. 3)

'# of MA offset' indicates the number of blocks to which encryption/decryption should not be applied from among all payloads due to misalignment from "St. Ctr". For example, according to the exemplary embodiments, the misalignment indicates that targets of encryption/decryption do not have 128 bits, but is not limited thereto.

For example, since FIG. 4B shows "# of MA offset=3", it may be seen that three regions 21, 26, and 30 are white except for the ES header. The three white regions 21, 26, and 30 are regions to which encryption/decryption should not be applied.

With regard to 'MaCtr/Valid', the misalignment may be traced by adding a value 'MaCtr' and a value of 'St.Ctr'.

$$\text{Misalignment Position} = St.Ctr + Ma\ Ctr \qquad (1)$$

For example, referring to FIG. 4B, the regions 21, 26, and 30 that are misaligned may be traced according to equations 18+3, 18+8, and 18+12, respectively.

'Valid' indicates the number of bytes to which encryption/decryption is not applied in the calculated MaCtr block.

For example, referring to FIG. 4B, the concept that Valid of the region 21 is 1 indicates that encryption/decryption is not applied to 1 byte only. With regard to the region 26, encryption/decryption is not applied to 8 bytes. With regard to the region 30, encryption/decryption is not applied to 6 bytes. Encryption/decryption is not applied as long as different lengths of white regions have different lengths in the regions 21, 26, and 30.

Figure 5A:
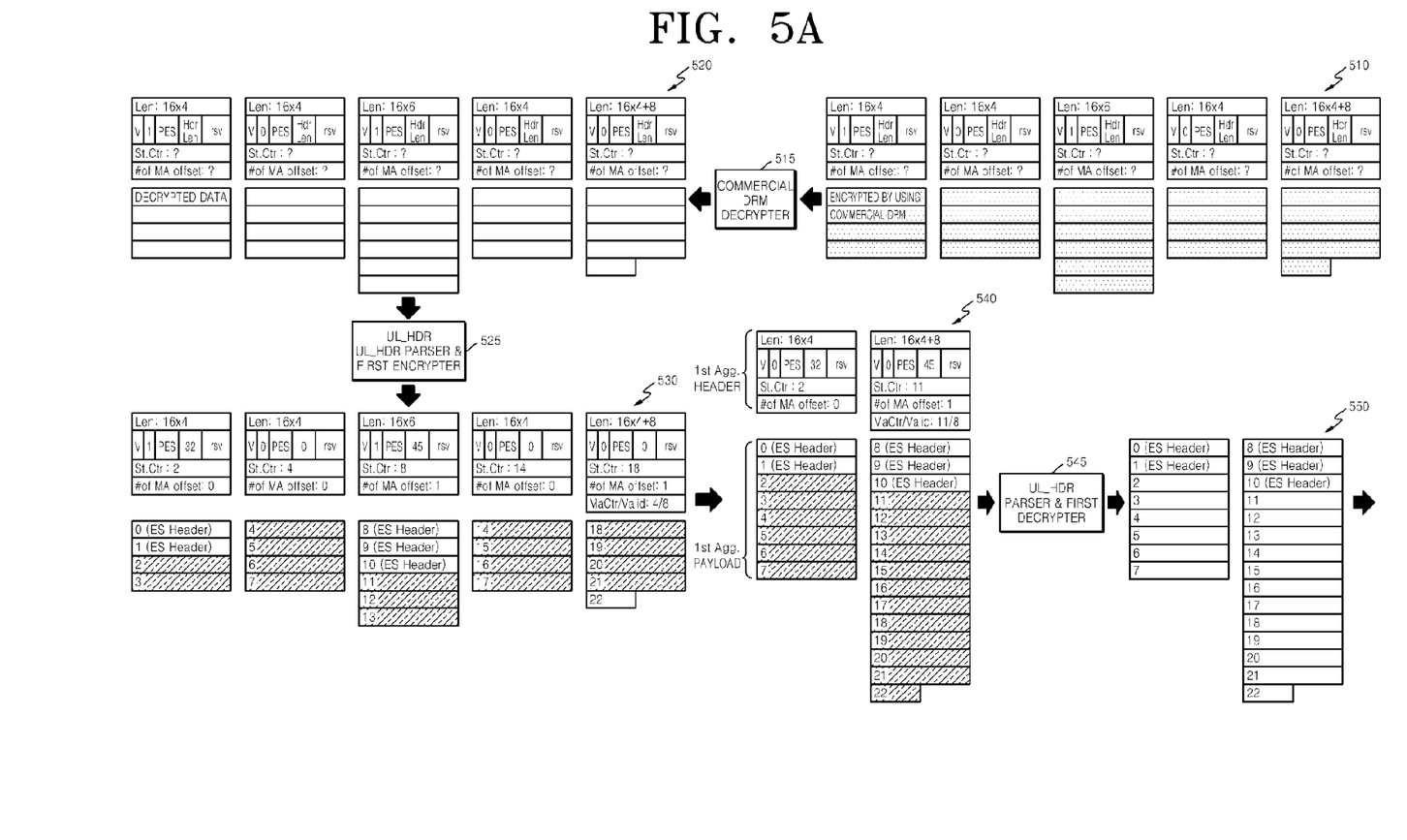
FIGS. 5A and 5B show data structures that are protected on a path from a point of time when commercial DRM is released to a point of time when data is rendered.
Figure 5B:
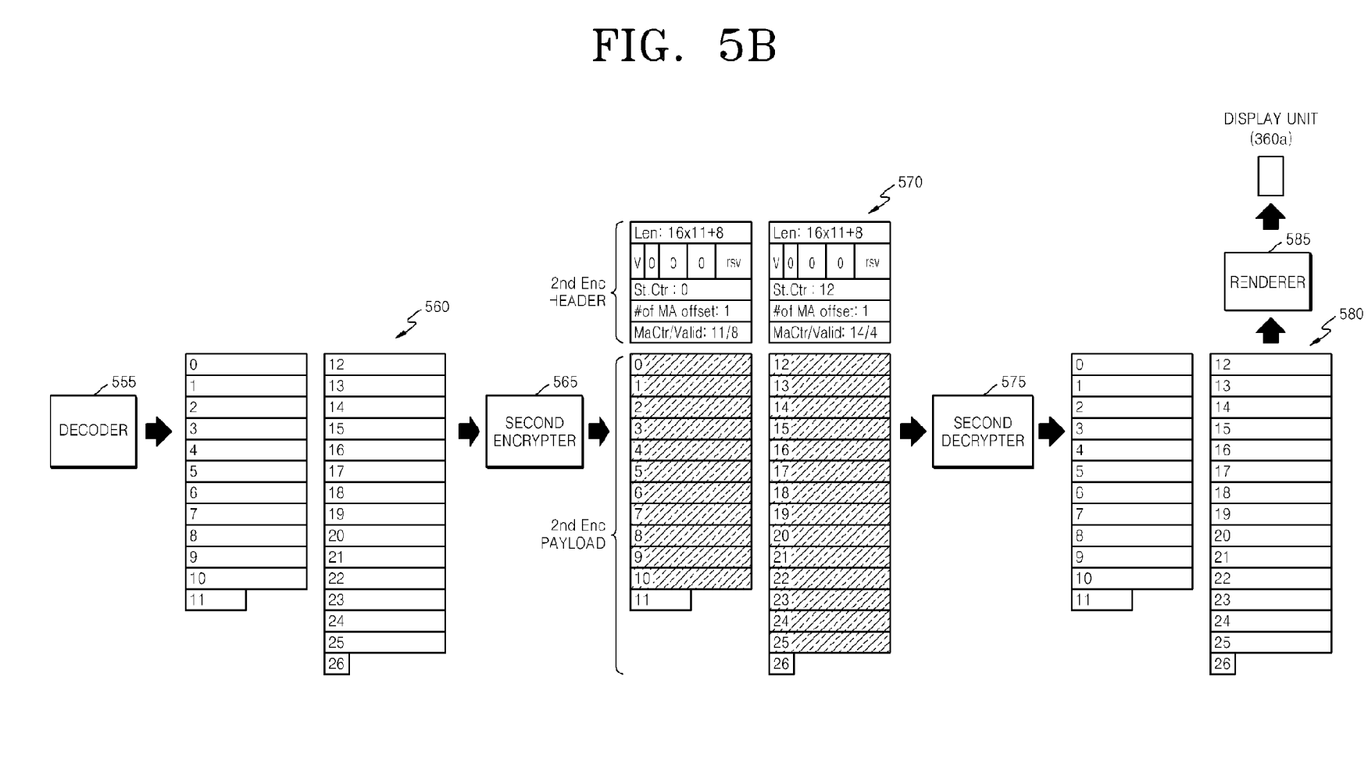

FIGS. 5A and 5B show data structures that are protected on a path from a point of time when commercial DRM is released to a point of time when rendering is performed on data. FIGS. 5A and 5B are based on the data structure of FIG. 4A.

Referring to FIG. 5A, a data structure 510 is encrypted by using the commercial DRM 515.

A data structure 520 is decrypted by a commercial DRM decrypter.

A data structure 530 is formed by an upper layer header (UL_HDR) parser & first encrypter 525, which parses header information of the data structure 520 and performs first encryption on a payload in a predetermined encryption range based on the header information.

For example, with regard to the data structure 530, when a header the rightmost data structure is referred to, since MA offset==1, it may be seen that a single region is white except for the ES header. The white region is a region to which encryption/decryption should not be applied.

In addition, Misalignment Position=St.Ctr+MaCtr=18+4=22.

Since Valid=8, encryption/decryption is not applied to 8 bytes in the calculated MaCtr block.

A security unit 140 may include a commercial DRM decrypter 515 and the UL_HDR parser & first encrypter 525.

A data structure 540 is a data structure formed by aggregating a header and payload packets of the data structure 530. For example, in order to collect PES packets to form a single ES packet prior to AV decoding, a media player (MP) of the controller 130*b* (refer to FIG. 3) may aggregate the PES packets.

When a transmission side finely divides an ES packet in order to transmit the ES packet, the divided packets need to be aggregated prior to decoding of the divided packets. Thus, if the ES packet itself is encrypted and transmitted without being divided by the transmission side, the data structure 540 may be omitted. A data structure 550 is a data structure formed by the UL_HDR parser & first decrypter 545, which parses header information of the data structure 540 and performs first decryption on a payload in a predetermined decryption range based on the header information.

Referring to FIG. 5B, a data structure 560 is formed by a decoder 555 decoding the data structure 550.

A data structure 570 is a data structure formed by a second encrypter 565 performing second encoding on a payload in a predetermined encryption range based on header information of the data structure 560.

The codec unit 340 may include the UL_HDR parser & first decrypter 545 and the decoder 555.

A data structure 580 is a data structure formed by a second decrypter 575 performing second decryption on the data structure 570.

The decrypted data structure 580 is rendered and displayed on a display unit 360.

The rendering unit 350 may include the second decrypter 575 and a renderer 575.

Figure 6:
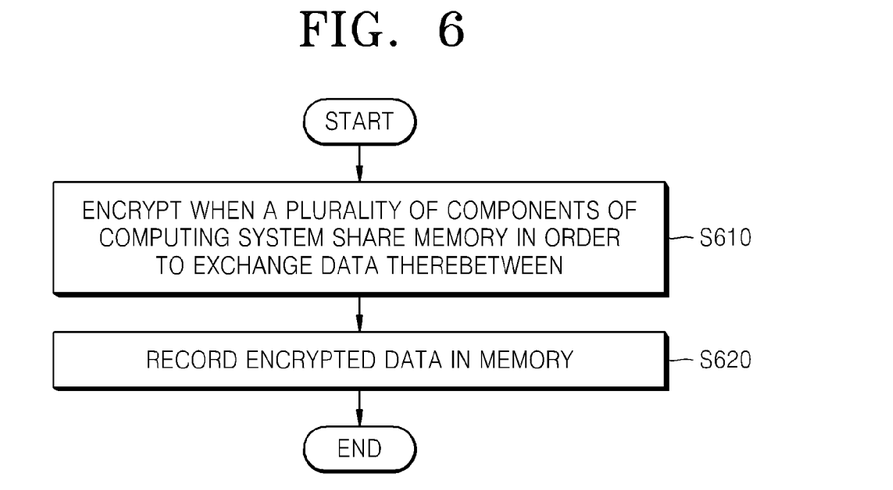
FIG. 6 is a flowchart of a method of operating a computing system, according to another exemplary embodiment.

FIG. 6 is a flowchart of a method of operating a computing system 100, according to another exemplary embodiment. The operation of FIG. 6 is the same as the operation of the computing system 100 described with reference to FIG. 1 and thus, will be simply described.

In operation 610, when components of the computing system 100 share the memory 120 in order to exchange data therebetween, the controller 130 controls the components to encrypt data. For example, when data is transmitted from the first component 140 to the second component 150 through the memory 120, the controller 130 controls the first component 140 to encrypt decrypted data.

In operation 620, the controller 130 controls the components to record the encrypted data in the memory 120. For example, the controller 130 controls the first component 140 to record the encrypted data in the memory 120.

With reference to FIGS. 2 through 4A, a method of protecting data on the shared memory 120 of the computing system 100 according to a single scenario according to an exemplary embodiment will now be described. An example of the computing system 100 may include a display device. Hereinafter, it is assumed that a data structure according to the scenario indicates the data structure described with reference to FIG. 4A.

The computing system 100 stores, in the memory 120, encrypted data that is safely received by using content protection technology (hereinafter, referred to as external protection technology) determined between the computing system 100 and a source device (not shown).

Then, the controller 130 generates the data structure before the external protection technology is released and fills a payload of the data structure with the data in which the external protection technology is released.

Then, the controller 130 controls the security unit 140*a* to release the external protection technology and to perform packetization on the data structure. The security unit 140*a* performs encryption/decryption based on header information of the data structure.

Then, a media player (MD) operating in the controller 130 controls a demultiplexer (DEMUX) to decode the payload of the data structure recovered from the security unit 140*a*.

Since the computing system 100 is designed so that a portion that is required to be referred to is not encrypted from among an encrypted payload in the data structure, the DEMUX has no problem when performing operations. However, since other remaining payloads themselves are encrypted, the other remaining payloads are safe from external attacks.

The media player (MD) calls the codec unit 340.

The codec unit 340 decrypts the encrypted data structure and decodes the decrypted data structure.

After the data is decoded, just before the data is written in the memory 120, the codec unit 340 applies the first protection technology to encrypt the decoded data structure and records the encrypted data structure in the memory 120.

The media player (MD) calls the rendering unit 350.

The rendering unit 350 decrypts the encrypted data structure and renders the encrypted data structure.

The exemplary embodiments can also be implemented as computer readable codes on a computer readable recording medium. The computer readable recording medium is any data storage device that can store programs or data which can be thereafter read by a computer system.

The computer readable codes are configured to perform methods of recording and reproducing an image according to the exemplary embodiments when being read and executed by a processor. The computer readable codes may be embodied by various programming languages. Functional programs, codes, and code segments for accomplishing the exemplary embodiments can be easily construed by programmers of ordinary skill in the art to which the exemplary embodiments pertain.

Examples of the computer readable recording medium include read-only memory (ROM), random-access memory (RAM), CD-ROMs, magnetic tapes, floppy disks, optical data storage devices, solid state drives (SSD), flash memories, and so on. The computer readable recording medium can also be distributed over network coupled computer systems so that the computer readable code is stored and executed in a distributed fashion.

While exemplary embodiments have been particularly shown and described, it will be understood by those of ordinary skill in the art that various changes in form and details may be made therein without departing from the spirit and scope of the inventive concept as defined by the following claims.

What is claimed is:

1. A computing system comprising:
a plurality of processors comprising a first processor and a second processor, the plurality of processors implemented as hardware and configured to encrypt a predetermined region of a payload and decrypt the encrypted predetermined region of the payload based on first information and second information, using a first protection technology;
a memory that is shared by the first processor and the second processor to exchange data between the first processor and the second processor; and
a first control circuitry configured to generate the first information indicating the predetermined region, of the payload, that is to be encrypted or decrypted using the first protection technology, to generate the second information indicating a position of a region, of the payload, in which encryption or decryption is not to be performed, to identify the predetermined region of the payload, to which the encryption or the decryption is to be applied using the first protection technology, based on the first information, to identify the region of the payload, to which the encryption or the decryption is not to be applied, based on the second information, to control the first processor to re-encrypt decrypted data using the first protection technology, to record the re-encrypted data in the memory and to transmit the re-encrypted data from the first processor to the second processor through the memory,
wherein the plurality of processors comprise:
a security circuitry which decrypts data that is encrypted by an external device using a second protection technology; and
a display control circuitry which controls display of data,
wherein the first control circuitry controls the memory to record the data that is encrypted using the second protection technology, controls the security circuitry to read and decrypt the data that is encrypted using the second protection technology and encrypt and record the decrypted data using the first protection technology, and controls the display control circuitry to read and decrypt the data that is encrypted using the first protection technology.

2. The computing system of claim 1, wherein each of the plurality of processors is configured to read and decrypt encrypted data and to use the decrypted data.

3. The computing system of claim 2, wherein the plurality of processors share the first protection technology for encrypting and decrypting data that is exchanged between the plurality of processors.

4. The computing system of claim 3, wherein the first control circuitry generates a data structure comprising a header and the payload, which are defined according to the first protection technology.

5. The computing system of claim 4, wherein the header comprises the first information indicating the predetermined region, of the payload, that is to be encrypted or decrypted using the first protection technology.

6. The computing system of claim 4, wherein the second protection technology comprises digital rights management (DRM).

7. The computing system of claim 1, wherein the display control circuitry is further configured to controller comprises:
encode and decode data; and
render the data,
wherein the first control circuitry controls to read and decrypt data that is encrypted using the first protection technology, and to re-encrypt and record the decrypted data using the first protection technology, and controls the to re-decrypt the re-encrypted data using the first protection technology, to render the re-decrypted data, and to output the rendered data on a display.

8. The computing system of claim 1, wherein the computing system comprises at least one of a digital television (DTV), a smart phone, a blue ray disc (BD), and a digital set top box (STB).

9. A method of operating a computing system, the method comprising:
generating first information indicating a predetermined region, of a payload, that is to be encrypted or decrypted using a first protection technology, and generating second information indicating a position of a region, of the payload, in which encryption or decryption is not to be performed;
identifying the predetermined region of the payload, to which the encryption or the decryption is to be applied using the first protection technology, based on the first information;
identifying the region of the payload, to which the encryption or the decryption is not to be applied, based on the second information;
re-encrypting decrypted data to exchange data between a plurality of components of the computing system, the plurality of components sharing a memory of the computing system;
recording the re-encrypted data in the memory using the first protection technology;
transmitting the re-encrypted data from a first component to a second component among the plurality of components through the memory; and
reading and decrypting the data that is encrypted using the first protection technology,
wherein the recording the encrypted data comprises recording data that is encrypted by an external device using a second protection technology,
wherein the reading and decrypting the encrypted data comprises reading and decrypting the data that is encrypted using the second protection technology,
wherein the re-encrypting the decrypted data comprises encrypting the decrypted data using the first protection technology, and
wherein the recording the re-encrypted data comprises recording the data that is re-encrypted using the first protection technology in the memory.

10. The method of claim 9, further comprising:
reading and decrypting encrypted data; and
using the decrypted data.

11. The method of claim 10, wherein the plurality of components share the first protection technology for encrypting and decrypting data that is exchanged between the plurality of components.

12. The method of claim 11, further comprising:
generating a data structure comprising a header and the payload, wherein the data structure is defined according to the first protection technology.

13. The method of claim 12, wherein the header comprises the first information indicating the predetermined region, of the payload, that is to be encrypted or decrypted using the first protection technology.

14. The method of claim 12, wherein the second protection technology comprises digital rights management (DRM).

15. A method of operating a computing system, the method comprising:
- generating, at a processor of the computing system, first information indicating a predetermined region, of a payload, that is to be encrypted or decrypted using a first protection technology, and generating second information indicating a position of a region, of the payload, in which encryption or decryption is not to be performed;
- identifying the predetermined region of the payload, to which the encryption or the decryption is to be applied using the first protection technology, based on the first information; identifying the region of the payload, to which the encryption or the decryption is not to be applied, based on the second information;
- receiving, at the processor of the computing system, second encrypted data which is encrypted according to a second protection technology;
- decrypting, at the processor of the computing system, the received second encrypted data to generate second unencrypted data;
- re-encrypting, at the processor of the computing system, the second unencrypted data according to the first protection technology to generate first re-encrypted data;
- recording, at the processor of the computing system, the first re-encrypted data in a memory;
- transmitting the first re-encrypted data from a first component to a second component among a plurality of components of the processor, through the memory;
- receiving, at the processor of the computing system, the first re-encrypted data and decrypting the first re-encrypted data according to the first protection technology to generate first un-encrypted data; and
- rendering, at the processor of the computing system, the first un-encrypted data,
- wherein the receiving the first re-encrypted data and decrypting the first re-encrypted data according to the first protection technology to generate the first un-encrypted data comprises receiving the first re-encrypted data at a graphics processing unit or and audio processing unit; and decrypting the first re-encrypted data at the graphics processing unit or the audio processing unit.

16. The method of claim 15, wherein the re-encrypting the second unencrypted data according to the first protection technology to generate the first re-encrypted data further comprises:
- generating a data structure comprising a header and the payload, wherein the data structure is adapted according to the first protection technology.

17. The method of claim 16, wherein the header comprises the first information indicating the predetermined region, of the payload, that is to be encrypted or decrypted using the first protection technology.

18. The method of claim 15, wherein the second protection technology comprises digital rights management.

* * * * *